US010604001B2

(12) United States Patent
Cho et al.

(10) Patent No.: US 10,604,001 B2
(45) Date of Patent: Mar. 31, 2020

(54) POWER TRANSMISSION APPARATUS FOR VEHICLE

(71) Applicants: Hyundai Motor Company, Seoul (KR); Kia Motors Corporation, Seoul (KR)

(72) Inventors: Wonmin Cho, Hwaseong-si (KR); Kijong Park, Hwaseong-si (KR); Seongwook Ji, Gunpo-si (KR); Ki Tae Kim, Incheon (KR); Ki Dong Kim, Anyang-si (KR); Hyun Sik Kwon, Seoul (KR); Cheol Ho Jang, Busan (KR); Soonki Eo, Ansan-si (KR); Seong Wook Hwang, Gunpo-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 5 days.

(21) Appl. No.: 16/110,958

(22) Filed: Aug. 23, 2018

(65) Prior Publication Data
US 2019/0202281 A1   Jul. 4, 2019

(30) Foreign Application Priority Data
Dec. 28, 2017   (KR) .......................... 10-2017-0182954

(51) Int. Cl.
*B60K 6/485*  (2007.10)
*B60K 6/547*  (2007.10)
(Continued)

(52) U.S. Cl.
CPC ............. *B60K 6/547* (2013.01); *B60K 6/365* (2013.01); *B60K 6/445* (2013.01); *B60K 6/485* (2013.01);
(Continued)

(58) Field of Classification Search
None
See application file for complete search history.

(56) References Cited

U.S. PATENT DOCUMENTS

2013/0324362 A1*  12/2013  Lee ....................... B60W 20/30
                                                                    477/5
2015/0184731 A1*   7/2015  Lee ....................... F16H 37/046
                                                                    475/5
(Continued)

FOREIGN PATENT DOCUMENTS

JP          4704494 B2    6/2011
KR      10-1338458 B1   12/2013
KR      10-1588796 B1    1/2016

*Primary Examiner* — Justin Holmes
(74) *Attorney, Agent, or Firm* — Morgan, Lewis & Bockius LLP

(57) ABSTRACT

A power transmission apparatus may include engine; first motor/generator; first rotation element fixed to the engine, second rotation element fixed to the first motor/generator, and third rotation element; first input shaft selectively connectable to the third rotation element; second input shaft selectively connectable to the third rotation element; third input shaft; an output shaft; an idle shaft operably connected to the second input shaft and the third input shaft; and speed stage module including drive gears rotatably disposed on the first input shaft, the third input shaft, or the idle shaft, driven gears meshed with the drive gears and fixed on the output shaft, and power delivery gears and an idle gear fixed on the second input shaft, the third input shaft, or the idle shaft, and synchronizers selectively connecting at least one among the drive gears to the first input shaft, the third input shaft, or the idle shaft.

17 Claims, 6 Drawing Sheets

(51) Int. Cl.
*F16H 3/00* (2006.01)
*F16H 3/091* (2006.01)
*F16H 37/08* (2006.01)
*B60K 6/365* (2007.10)
*B60K 6/445* (2007.10)
*B60K 6/48* (2007.10)
*F16H 3/093* (2006.01)

(52) U.S. Cl.
CPC ............. *F16H 3/006* (2013.01); *F16H 3/091* (2013.01); *F16H 37/0826* (2013.01); *B60K 2006/4825* (2013.01); *B60Y 2200/92* (2013.01); *F16H 3/093* (2013.01); *F16H 2200/0043* (2013.01); *F16H 2200/0095* (2013.01)

(56) References Cited

U.S. PATENT DOCUMENTS

2016/0102742 A1* 4/2016 Lee .................... B60K 6/36
 475/5
2016/0207393 A1* 7/2016 Takamiya ............... B60L 58/24

\* cited by examiner

FIG. 2

| Driving mode | Shift-stage | CL1 | CL2 | SL1 | | | SL2 | | | SL3 | | Motor |
|---|---|---|---|---|---|---|---|---|---|---|---|---|
| | | | | D1 | N | D3 | D2 | N | D4 | N | RD | |
| HEV | REV | | △ | | ● | | | ● | | | ● | □ |
| | FD1 | △ | | ● | | | | ● | | ● | | □ |
| | FD2 | | △ | | ● | | ● | | | ● | | □ |
| | FD3 | △ | | | | ● | | ● | | ● | | □ |
| | FD4 | | △ | ● | | | | | ● | ● | | □ |

△ : Clutch operation     ● : Shifting position     □ : Torque assistance driving

FIG. 5

| Driving mode | Shift-stage | CL1 | CL2 | SL1 | | | SL2 | | | Motor1 | Motor2 |
|---|---|---|---|---|---|---|---|---|---|---|---|
| | | | | D1 | N | D3 | D2 | N | D4 | | |
| EV | EV-REV | | | | ● | | | ● | | | ■ (역회전) |
| | EV-FD1 | | | | ● | | | ● | | | ■ (정회전) |
| HEV | REV1 | △ | | ● | | | | ● | | ■ | □ |
| | REV2 | | △ | | ● | | ● | | | ■ | □ |
| | REV3 | △ | | | | ● | | ● | | ■ | □ |
| | REV4 | | △ | | ● | | | | ● | ■ | □ |
| | FD1 | △ | | ● | | | | ● | | ■ | □ |
| | FD2 | | △ | | ● | | ● | | | ■ | □ |
| | FD3 | △ | | | | ● | | ● | | ■ | □ |
| | FD4 | | △ | | ● | | | | ● | ■ | □ |

△ : Clutch operation  □ : Torque assistance driving
● : Shifting position  ■ : Only motor driving (EV)

POWER TRANSMISSION APPARATUS FOR VEHICLE

CROSS-REFERENCE TO RELATED APPLICATION

The present application claims priority to Korean Patent Application No. 10-2017-0182954 filed on Dec. 28, 2017, the entire contents of which is incorporated herein for all purposes by this reference.

BACKGROUND OF THE INVENTION

Field of the Invention

The present invention relates to a power transmission apparatus for a vehicle. More particularly, the present invention relates to a power transmission apparatus for a vehicle having advantages of achieving multiple fixed speed stages by adding one planetary gear set and facilitating a generation and a torque assistance, and an electric vehicle mode driving by adding a motor/generator in a dual clutch transmission structure including two or three synchronizers, improving a fuel consumption and an acceleration performance.

Description of Related Art

An environmentally-friendly technology of a vehicle is a core technology which controls survival of a future automobile industry, and advanced vehicle makers have focused on the development of an environmentally-friendly vehicle to achieve environmental and fuel efficiency regulations.

An electric vehicle (EV) or a hybrid electric vehicle (HEV) that utilizes electrical energy, or a double clutch transmission (DCT) improving efficiency and convenience of a transmission may be examples of such a future vehicle technology.

Since the future vehicle has various technological restrictions such as a weight and cost, the vehicle makers have paid attention to the hybrid electric vehicle as an alternative of a realistic problem for meeting exhaust gas regulations and improving fuel efficiency performance and have entered into keen competition for commercializing the hybrid electric vehicle.

The hybrid electric vehicle is a vehicle using two or more power sources. Two or more power sources may be combined by various schemes and a gasoline engine or a diesel engine using the existing fossil fuel and a motor/generator driven by electrical energy are mixed and used as the power sources.

The hybrid electric vehicle generally utilizes an engine and a motor/generator, and utilizes as a primary power source a motor/generator having a relatively excellent low-speed torque characteristic at a low speed and utilizes as the primary power source an engine having a relatively excellent high-speed torque characteristic at a high speed.

As a result, the hybrid electric vehicle is excellent in fuel efficiency enhancement and reduction of exhaust gas because an operation of the engine using fossil fuel stops and the motor/generator is used at a low-speed section.

A dual clutch transmission (DCT) may be an example of a transmission applicable to such a hybrid electric vehicle, and the DCT may include two clutches applied to a manual transmission scheme, and thereby enhances efficiency and convenience.

The DCT alternatingly activates odd-numbered stages and even-numbered stages by alternatingly operating two clutches, and thereby improves continuity in torque transmission.

However, the DCT shows relatively high degree of clutch wear and energy loss in starting of a vehicle and rearward slip in starting of a vehicle on a slant. Furthermore, the DCT is typically controlled with a short shift-control period considering low heat capacity, and thus may easily show a shift shock.

Furthermore, to apply the DCT to a hybrid electric vehicle, an appropriate arrangement of a motor/generator as a power source may be devised.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a power transmission apparatus for a vehicle of realizing multiple fixed speed stages while minimizing a number of internal configuration parts and implementing a mountability improvement due to an enhancement of fuel consumption and a volume reduction by a weight minimization by adding one planetary gear set to a DCT structure using three synchronizers.

Various aspects of the present invention are directed to providing a power transmission apparatus for vehicle by adding one or two motor/generator to a DCT structure to be driven with an electric vehicle (EV) mode and a hybrid electric vehicle (HEV) mode, improving a fuel consumption.

A power transmission apparatus for a vehicle according to an exemplary embodiment of the present invention may include an engine; a first motor/generator; a planetary gear set including a first rotation element fixedly connected to the engine, a second rotation element fixedly connected to the first motor/generator, and a third rotation element outputting a rotation speed in which the rotation speed of the engine and the rotation speed of the first motor/generator are combined; a first input shaft selectively connectable to the third rotation element through a first clutch; a second input shaft enclosing at least a portion of the first input shaft and selectively connectable to the third rotation element through a second clutch; a third input shaft disposed parallel to and separated from the first input shaft; an output shaft disposed parallel to and separated from the first input shaft; an idle shaft disposed parallel to and separated from the second input shaft and operably connected to the second input shaft and the third input shaft through gears to transmit a rotation speed of the second input shaft to the third input shaft; and a fixed speed stage module including a plurality of shifting gear sets which may include at least two of drive gears each being rotatably disposed on the first input shaft, the third input shaft, or the idle shaft, driven gears each being meshed with any one among the drive gears and fixedly disposed on the output shaft, and power delivery gears and an idle gear each being fixedly disposed on the second input shaft, the third input shaft, or the idle shaft and meshed with another, and a plurality of synchronizers selectively connecting at least one among the drive gears to the first input shaft, the third input shaft, or the idle shaft.

The planetary gear set may be a single pinion planetary gear set, the first rotation element may be a planet carrier, the second rotation element may be a sun gear, and the third rotation element may be a ring gear.

The plurality of shifting gear sets may have a first shifting gear set including a first drive gear rotatably disposed on the first input shaft, a second drive gear rotatably disposed on the third input shaft, and a first driven gear fixedly disposed on the output shaft and simultaneously meshed with the first drive gear and the second drive gear; a second shifting gear set including a reverse drive gear rotatably disposed on the idle shaft and a second driven gear fixedly connected to the output shaft and meshed with the reverse drive gear; a third shifting gear set including a third drive gear rotatably disposed on the first input shaft, a fourth drive gear rotatably disposed on the third input shaft, and a third driven gear fixedly disposed on the output shaft and simultaneously meshed with the third drive gear and the fourth drive gear; and a fourth shifting gear set including a first power delivery gear fixedly disposed on the second input shaft, a second power delivery gear fixedly disposed on the third input shaft, and an idle gear fixedly disposed on the idle shaft and simultaneously meshed with the first power delivery gear and the second power delivery gear.

The plurality of synchronizers may include a first synchronizer selectively connecting the first drive gear or the third drive gear to the first input shaft; a second synchronizer selectively connecting the second drive gear or the fourth drive gear to the third input shaft; and a third synchronizer selectively connecting the reverse drive gear to the idle shaft.

The plurality of shifting gear sets may include a first shifting gear set including a first drive gear rotatably disposed on the first input shaft, a second drive gear rotatably disposed on the third input shaft, and a first driven gear fixedly disposed on the output shaft and simultaneously meshed with the first drive gear and the second drive gear; a third shifting gear set including a third drive gear rotatably disposed on the first input shaft, a fourth drive gear rotatably disposed on the third input shaft, and a third driven gear fixedly disposed on the output shaft and simultaneously meshed with the third drive gear and the fourth drive gear; and a fourth shifting gear set including a first power delivery gear fixedly disposed on the second input shaft, a second power delivery gear fixedly disposed on the third input shaft, and an idle gear fixedly disposed on the idle shaft and simultaneously meshed with the first power delivery gear and the second power delivery gear.

The plurality of synchronizers may include a first synchronizer selectively connecting the first drive gear or the third drive gear to the first input shaft; and a second synchronizer selectively connecting the second drive gear or the fourth drive gear to the third input shaft.

The power transmission apparatus may further include a second motor/generator fixedly connected to the output shaft.

The planetary gear set may be a single pinion planetary gear set, the first rotation element may be the ring gear, the second rotation element may be the sun gear, and the third rotation element may be the planet carrier.

The power transmission apparatus may further include an output gear fixedly disposed on the output shaft; and a differential apparatus including a final reduction gear meshed with the output gear.

As the power transmission apparatus according to the several exemplary embodiments of the present invention adds one motor/generator and one planetary gear set to the conventional DCT structure using three synchronizers, the fixed speed stage of multi-stages including four forward speed stages and one reverse speed stage may be realized while minimizing a number of internal configuration parts in the HEV mode, a weight may be minimized, a mountability and a fuel consumption may be improved.

As the power transmission apparatus according to the several exemplary embodiments of the present invention adds two motor/generators to the conventional DCT structure using two synchronizers, the EV mode implementing the forward/reverse driving and the HEV mode implementing four forward speed stages and four reverse speed stages may be provided, improving the fuel consumption.

Furthermore, effects that can be obtained or expected from exemplary embodiments of the present invention are directly or suggestively described in the following detailed description. That is, various effects expected from exemplary embodiments of the present invention will be described in the following detailed description.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a shifting operational chart for a power transmission apparatus for a vehicle according to various exemplary embodiments of the present invention.

FIG. 5 is a shifting operational chart for a power transmission apparatus for a vehicle according to various exemplary embodiments of the present invention.

Figure 1:
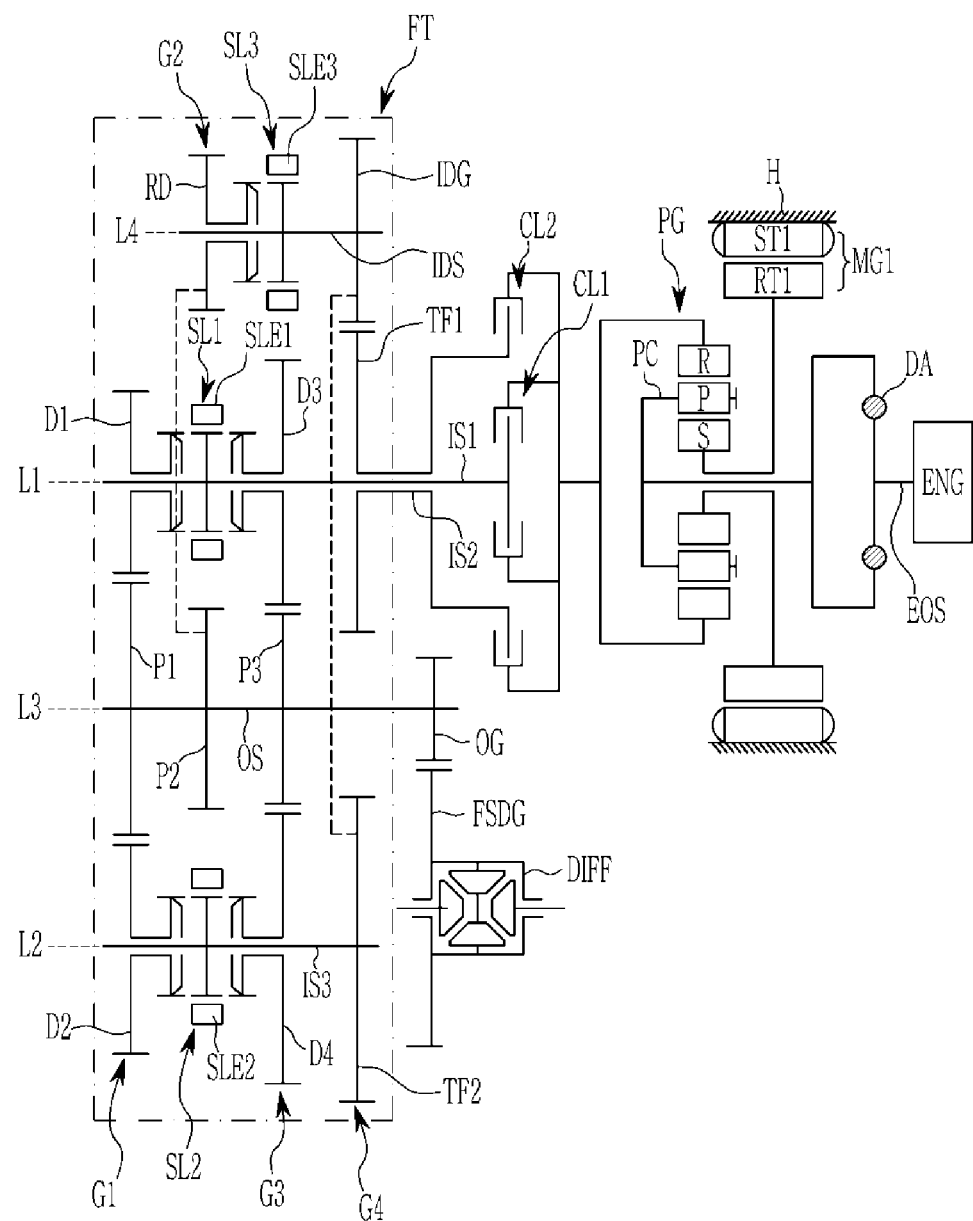
FIG. 1 is a schematic view of a power transmission apparatus for a vehicle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Exemplary embodiments of the present application will be described more fully hereinafter with reference to the accompanying drawings, in which exemplary embodiments of the present invention are shown. As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

In the following description, dividing names of components into first, second and the like is to divide the names because the names of the components are the same as each other and an order thereof is not particularly limited.

FIG. 1 is a schematic diagram of a power transmission apparatus according to various exemplary embodiments of the present invention.

Referring to FIG. 1, a power transmission apparatus according to various exemplary embodiments of the present invention includes a first motor/generator MG1 configured for a reverse driving and a torque assistance of a vehicle, a planetary gear set PG increasing or decreasing a rotation speed of an engine ENG, and three synchronizers SL1, SL2, and SL3. Also, the power transmission apparatus further includes a fixed speed stage module FT realizing a fixed speed stage including four forward speed stages and one reverse speed stage.

The engine ENG as a power source may be realized as a various kind of typical engines such as a gasoline engine or a diesel engine that utilizes fossil fuel.

The fixed speed stage module FT is disposed on first, second, third and fourth shaft lines L1, L2, L3, and L4 mutually disposed in parallel at a predetermined interval. The first motor/generator MG1 and the planetary gear set PG are disposed on the first shaft line L1.

The fixed speed stage module FT is described in detail.

The first motor/generator MG1, the planetary gear set PG, and the first, second input shafts IS1 and IS2 are disposed on the first shaft line L1 from the engine ENG side to a rear side. The third input shaft IS3 is dispose on the second shaft line L2, an output shaft OS is disposed on the third shaft line L3, and an idle shaft IDS is disposed on the fourth shaft line L4.

Here, the first motor/generator MG1 disposed on the first shaft line L1 performs both function of a motor and a generator as known in the art. The first motor/generator MG1 includes a stator ST1 fixed to a transmission housing H and a rotor RT1 rotatably disposed inside a radius direction of the stator ST1.

The planetary gear set PG includes a single pinion planetary gear set and includes a sun gear S, a planet carrier PC rotatable supporting a plurality of pinion gears P engaged with the sun gear S, and a ring gear R engaged with the plurality of pinion gears P to be optionally connected to the sun gear S.

Also, the sun gear S is connected to a first rotor RT1 of the first motor/generator MG1, the planet carrier PC is fixedly connected to an engine output shaft EOS through a damper DA, and the ring gear R is selectively connectable to the fixed speed stage module FT as an output element.

Accordingly, the sun gear S acts as an input element receiving a driving torque of the first motor/generator MG1, the planet carrier PC acts as another input element receiving the driving rotational power of the engine ENG, and the ring gear R always acts as an output element.

The first input shaft IS1 disposed on the first shaft line L1 is selectively connectable to the ring gear R of the planetary gear set PG through a first clutch CL1, the rotational power of the ring gear R of the planetary gear set PG is selectively transmitted to the fixed speed stage module FT.

The second input shaft IS2 disposed on the first shaft line L1 is formed of a hollow shaft, is disposed at an external circumference side of the first input shaft IS1 without an interference, and is selectively connectable to the ring gear R of the planetary gear set PG through the second clutch CL2.

The second input shaft IS2 selectively transmits the rotational power of the ring gear R of the planetary gear set PG to the idle shaft IDS.

The third input shaft IS3 disposed on the second shaft line L2 transmits the rotational power of the second input shaft IS2 transmitted through the idle shaft IDS of the fixed speed stage module FT.

The output shaft OS disposed on the third shaft line L3 transmits the driving torque of the engine ENG changed in the fixed speed stage module FT or the driving torque of the first motor/generator MG1 to a final reduction gear FSDG of a differential apparatus DIFF through an output gear OG.

The idle shaft IDS disposed on the fourth shaft line L4 transmits the rotational power input from the second input shaft IS2 to the third input shaft IS3.

The fixed speed stage module FT includes first, second, third and fourth shifting gear sets G1, G2, G3, and G4 disposed on the first, second, and third input shafts IS1, IS2, and IS3 and the idle shaft IDS.

The first, second, third, fourth shifting gear sets G1, G2, G3, and G4 are disposed in order of the first, second, third, fourth shifting gear sets G1, G2, G3, and G4 from an opposite side of the engine ENG to the engine ENG side.

The first shifting gear set G1 includes a first drive gear D1 rotatably disposed on the first input shaft IS1, a second drive gear D2 rotatably disposed on the third input shaft IS3, and a first driven gear P1 fixedly disposed on the output shaft OS and simultaneously meshed with the first drive gear D1 and the second drive gear D2.

The second shifting gear set G2 includes a reverse drive gear RD rotatably disposed on the idle shaft IDS and a second driven gear P2 fixedly disposed on the output shaft OS and meshed with the reverse drive gear RD.

The third shifting gear set G3 includes a third drive gear D3 rotatably disposed on the first input shaft IS1, a fourth drive gear D4 rotatably disposed on the third input shaft IS3, and a third driven gear P3 fixedly disposed on the output shaft OS and simultaneously meshed with the third drive gear D3 and the fourth drive gear D4.

The fourth shifting gear set G4 includes a first power delivery gear TF1 fixedly disposed on the second input shaft IS2, a second power delivery gear TF2 fixedly disposed on the third input shaft IS3, and an idle gear IDG fixedly disposed to the idle shaft IDS and simultaneously meshed with the first power delivery gear TF1 and the second power delivery gear TF2.

Here, "a gear is fixedly disposed on a shaft" means that a corresponding gear is always rotated in the same direction with the same rotation speed as a corresponding shaft. Also, "a gear is rotatably disposed on a shaft" means that a corresponding gear is relatively rotated with a corresponding shaft.

The first synchronizer SL1 is disposed between the first driving gear D1 and the third driving gear D3 to selectively connect the first driving gear D1 and the third driving gear D3 to the first input shaft IS1.

Also, the second synchronizer SL2 is disposed between the second driving gear D2 and the fourth driving gear D4 to selectively connect the second driving gear D2 and the fourth driving gear D4 to the third input shaft IS3.

Also, the third synchronizer SL3 is disposed between the reverse driving gear RD and the idle shaft IDS to selectively connect the reverse driving gear RD to the idle shaft IDS.

A gear ratio of the drive gears and the driven gears included in four shifting gear sets G1, G2, G3, and G4 of the fixed speed stage module FT may be changed according to a design condition of the corresponding power transmission apparatus. In the various exemplary embodiments of the present invention, the first drive gear D1 and the first driven gear P1 of the first shifting gear set G1 may be set as the gear ratio for a first forward speed stage, the second drive gear D2 and the first driven gear P1 may be set as the gear ratio for a second forward speed stage, the reverse drive gear RD and the second driven gear P2 of the second shifting gear set G2 may be set as the gear ratio for a reverse speed, the third drive gear D3 and the third driven gear P3 of the third shifting gear set G3 may be set as the gear ratio for a third forward speed stage, and the fourth drive gear D4 and the third driven gear P3 may be set as the gear ratio for a fourth forward speed stage. Also, the gear ratio of the fourth shifting gear set G4 is not limited thereto, however the third input shaft IS3 and the second input shaft IS2 may be set to be rotated in the same rotation speed and the same rotation direction thereof.

The first, second, and third synchronizers SL1 to SL3 are known configurations, so that the detailed descriptions thereof is omitted. First, second, and third sleeve SLE1, SLE2, and SLE3 applied to the first, second, and third synchronizers SL1, SL2, and SL3 are operated by a separate actuator as known to a person of an ordinary skill in the art, and the actuator is controlled by a transmission control device.

The first and second clutches CL1 and CL2 as an engagement element may be a hydraulic pressure friction engagement device operated by a hydraulic pressure supplied from a hydraulic pressure control apparatus. As the engagement elements, it is not limited thereto, and a multi-plate type hydraulic pressure friction engagement device of a wet type may be mainly used. However it may include the engagement device which is operated depending on an electrical signal supplied from an electric control apparatus such as a dog clutch, a differential apparatus clutch, an electronic clutch, etc.

FIG. 2 is a shifting operational chart of a power transmission apparatus according to various exemplary embodiments of the present invention. The power transmission apparatus according to the various exemplary embodiments of the present invention may realize four forward speed stages and one reverse speed stage in a hybrid mode HEV.

[The Reverse Speed]

In the reverse speed stage REV, as shown in FIG. 2, the reverse drive gear RD and the idle shaft IDS are operably connected through the sleeve SLE3 of the third synchronizer SL3 and the second clutch CL2 is operated.

Accordingly, the rotation speed of the engine ENG is input to the planet carrier PC, and the rotation speed of the first motor/generator M1 is input to the sun gear S. The rotation speed of the engine ENG and the rotation speed of the first motor/generator M1 are combined in the planetary gear set PG and the combined rotation speed is output through the ring gear R. The rotation speed of the ring gear R is transmitted to the output gear OG through the second clutch CL2, the second input shaft IS2, the first power delivery gear TF1, the idle gear IDG, the idle shaft IDS, the reverse drive gear RD, the second driven gear P2, and the output shaft OS by the operation of the second clutch CL2, and the rotation speed output to the output gear OG is output as the reverse speed stage through the final reduction gear FSDG of the differential apparatus DIFF.

[The First Forward Speed Stage]

In the first forward speed stage FD1, as shown in FIG. 2, the first drive gear D1 and the first input shaft IS1 are operably connected through the sleeve SLE1 of the first synchronizer SL1, and the first clutch CL1 is operated.

Accordingly, the rotation speed of the engine ENG is input to the planet carrier PC, and the rotation speed of the first motor/generator M1 is input to the sun gear S. The rotation speed of the engine ENG and the rotation speed of the first motor/generator M1 are combined in the planetary gear set PG and the combined rotation speed is output through the ring gear R. The rotation speed of the ring gear R is transmitted to the output gear OG through the first clutch CL1, the first input shaft IS1, the first drive gear D1, the first driven gear P1, and the output shaft OS by the operation of the first clutch CL1, and the rotation speed output to the output gear OG is output as the first forward speed stage through the final reduction gear FSDG of the differential apparatus DIFF.

[The Second Forward Speed Stage]

In the second forward speed stage FD2, as shown in FIG. 2, the second drive gear D2 and the third input shaft IS3 are operably connected through the sleeve SLE2 of the second synchronizer SL2 and the second clutch CL2 is operated.

Accordingly, the rotation speed of the engine ENG is input to the planet carrier PC, and the rotation speed of the first motor/generator M1 is input to the sun gear S. The rotation speed of the engine ENG and the rotation speed of the first motor/generator M1 are combined in the planetary gear set PG and the combined rotation speed is output through the ring gear R. The rotation speed of the ring gear R is transmitted to the output gear OG through the second clutch CL2, the second input shaft IS2, the first power delivery gear TF1, the idle gear IDG, the second power delivery gear TF2, the third input shaft IS3, the second drive gear D2, the first driven gear P1, and the output shaft OS by the operation of the second clutch CL2, and the rotation speed output to the output gear OG is output as the second forward speed stage through the final reduction gear FSDG of the differential apparatus DIFF.

[The Third Forward Speed Stage]

In the third forward speed stage FD3, as shown in FIG. 2, the third drive gear D3 and the first input shaft IS1 are operably connected through the sleeve SLE1 of the first synchronizer SL1 and the first clutch CL1 is operated.

Accordingly, the rotation speed of the engine ENG is input to the planet carrier PC, and the rotation speed of the first motor/generator M1 is input to the sun gear S. The rotation speed of the engine ENG and the rotation speed of the first motor/generator M1 are combined in the planetary gear set PG and the combined rotation speed is output through the ring gear R. The rotation speed of the ring gear R is transmitted to the output gear OG through first clutch CL1, the first input shaft IS1, the third drive gear D3, the third driven gear P3, and the output shaft OS by the operation of the first clutch CL1, and the rotation speed output to the output gear OG is output as the third forward speed stage through the final reduction gear FSDG of the differential apparatus DIFF.

[The Fourth Forward Speed Stage]

In the fourth forward speed stage FD4, as shown in FIG. 2, the fourth drive gear D4 and the third input shaft IS3 are operably connected though the sleeve SLE2 of the second synchronizer SL2 and the second clutch CL2 is operated.

Accordingly, the rotation speed of the engine ENG is input to the planet carrier PC, and the rotation speed of the first motor/generator M1 is input to the sun gear S. The rotation speed of the engine ENG and the rotation speed of the first motor/generator M1 are combined in the planetary gear set PG, and the combined rotation speed is output through the ring gear R. The rotation speed of the ring gear R is transmitted to the output gear OG through the second clutch CL2, the second input shaft IS2, the first power delivery gear TF1, the idle gear IDG, the second power delivery gear TF2, the third input shaft IS3, the fourth drive gear D4, the third driven gear P3, and the output shaft OS by the operation of the second clutch CL2, and the rotation speed output to the output gear OG is output as the fourth forward speed stage through the final reduction gear FSDG of the differential apparatus DIFF.

The power transmission apparatus according to the various exemplary embodiments of the present invention may realize the fixed speed stage including the first forward speed stage to the fourth forward speed stage and the reverse speed stage. Also, even if the rotation speed of the engine ENG is the same in each speed stage, the rotation speed output through the ring gear R may be differentiate by the torque assistance (i.e., the rotation speed of the first motor/generator MG1) of the first motor/generator MG1.

Figure 3:
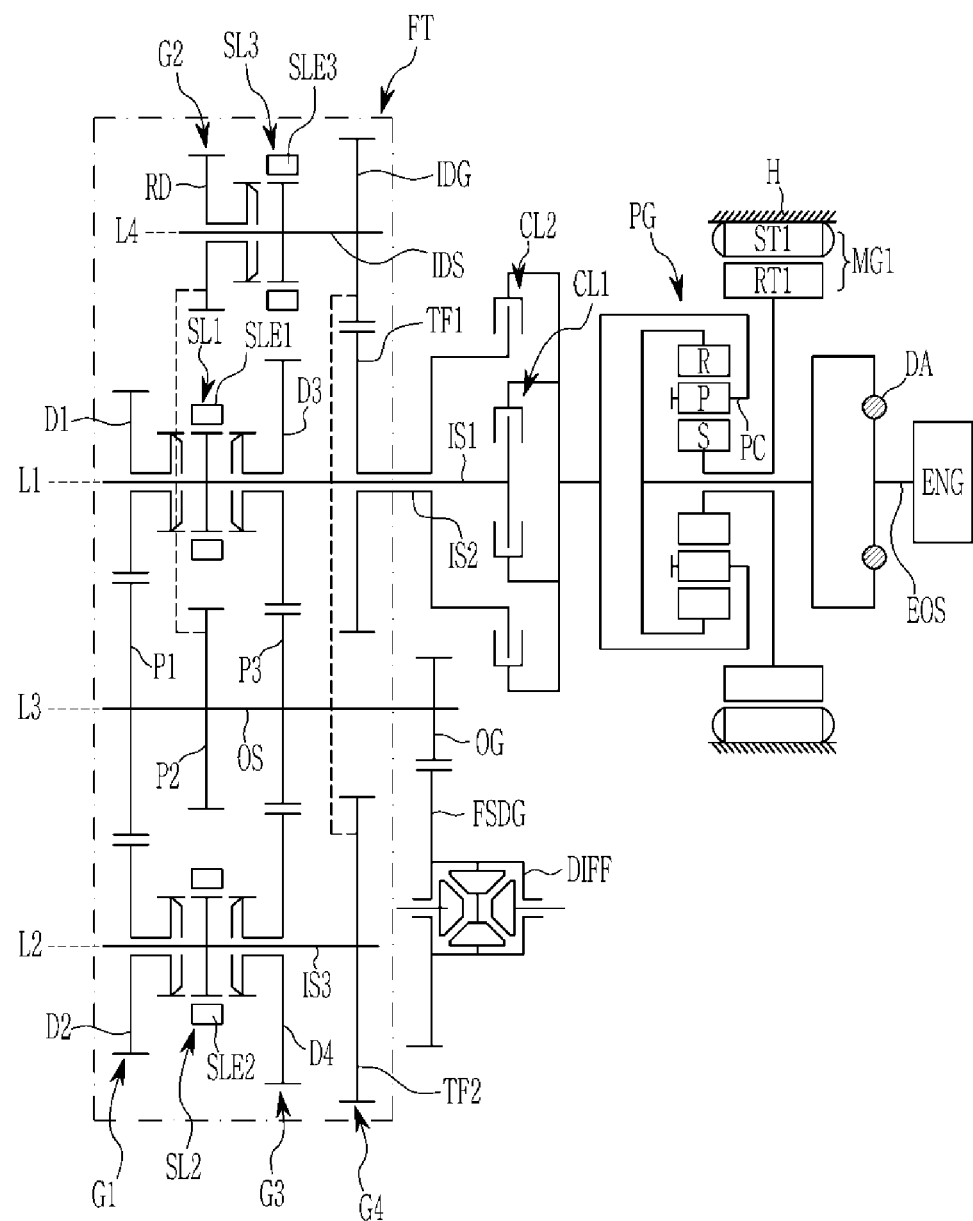
FIG. 3 is a schematic view of a power transmission apparatus for a vehicle according to various exemplary embodiments of the present invention.

FIG. 3 is a schematic diagram of a power transmission apparatus according to various exemplary embodiments of the present invention.

Referring to FIG. 3, the power transmission apparatus according to the various exemplary embodiments of the present invention is the same as the power transmission apparatus of FIG. 1 except for the connection configuration of the rotation elements S, PC, and R of the planetary gear set PG, the engine ENG, and the first motor/generator MG1.

In detail, in the FIG. 1, the sun gear S is fixedly connected to the first motor/generator MG1, the planet carrier PC is fixedly connected to the engine ENG, and the ring gear R is always operated as the output element, however in FIG. 3, the sun gear S is operated as the input element fixedly connected to the first motor/generator MG1, the planet carrier PC is always operated as the output element, and the ring gear R is fixedly connected to the engine ENG to be operated as the input element.

The shifting process and the power delivery path of FIG. 3 are the same as that of FIG. 1, such that the detailed description thereof is omitted.

Figure 4:
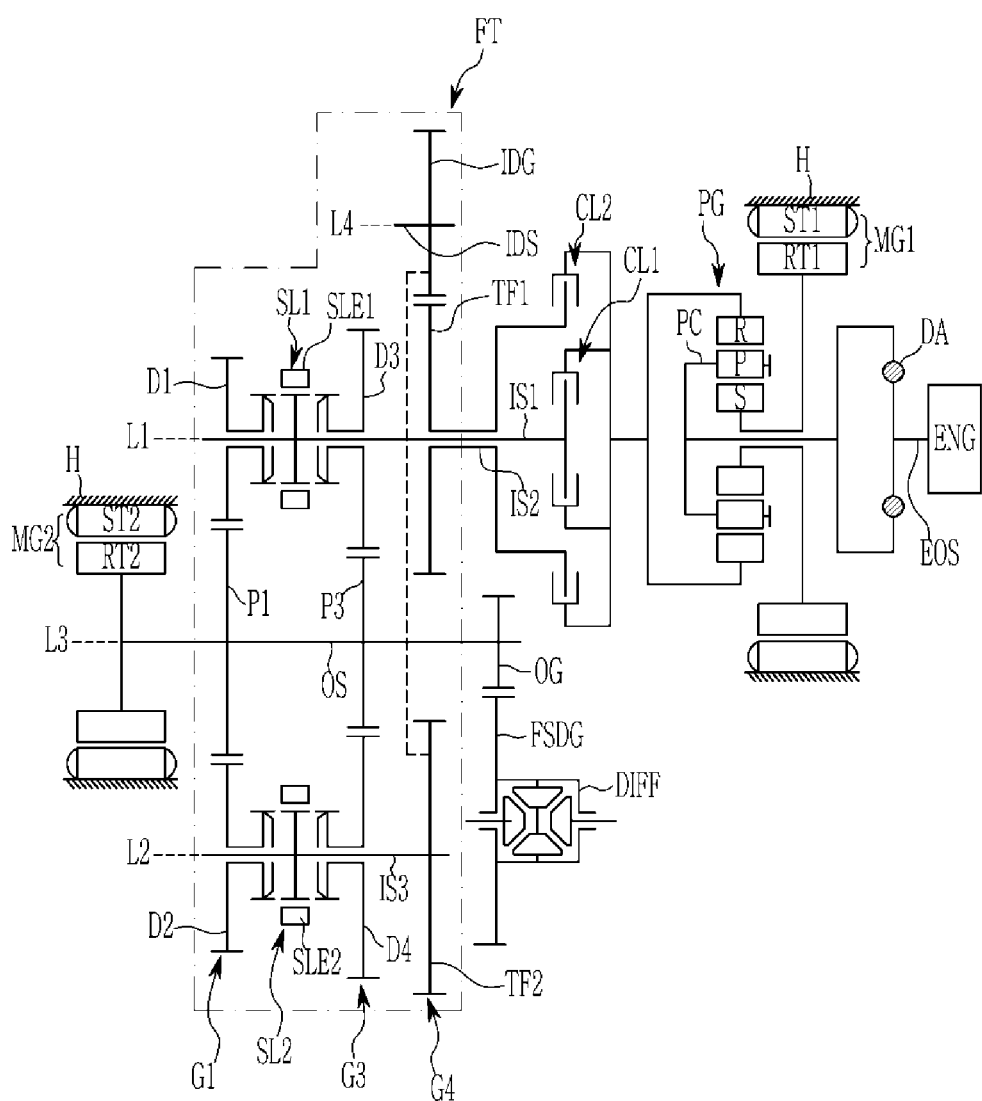
FIG. 4 is a schematic view of a power transmission apparatus for a vehicle according to various exemplary embodiments of the present invention.

FIG. 4 is a schematic diagram of a power transmission apparatus according to various exemplary embodiments of the present invention.

Referring to FIG. 4, the power transmission apparatus according to the various exemplary embodiments of the present invention omits a third synchronizer SL3 for realizing the reverse speed stage and additionally disposes a second motor/generator MG2 on the output shaft OS compared with the FIG. 1.

The second motor/generator MG2 performs the functions of the motor and the generator like the first motor/generator MG1 and includes a second stator ST2 fixed to the transmission housing H and a second rotor RT2 rotatably disposed inside the radius direction of the second stator ST2. The second rotor RT is fixedly connected to the output shaft OS.

Also, the second shifting gear set G2 is also omitted along with the omitting of the third synchronizer SL3.

The first, third, and fourth shifting gear sets G1, G3, and G4 are described.

The first shifting gear set G1 includes a first drive gear D1 rotatably disposed on the first input shaft IS1, a second drive gear D2 rotatably disposed on the third input shaft IS3, and a first driven gear P1 fixedly disposed on the output shaft OS and simultaneously meshed with the first drive gear D1 and the second drive gear D2.

The third shifting gear set G3 includes a third drive gear D3 rotatably disposed on the first input shaft IS1, a fourth drive gear D4 rotatably disposed on the third input shaft IS3, and a third driven gear P3 fixedly disposed on the output shaft OS and simultaneously meshed with the third drive gear D3 and the fourth drive gear D4.

The fourth shifting gear set G4 includes a first power delivery gear TF1 fixedly disposed on the second input shaft IS2, a second power delivery gear TF2 fixedly disposed on the third input shaft IS3, and an idle gear IDG fixedly disposed on the idle shaft IDS and simultaneously meshed with the first power delivery gear TF1 and the second power delivery gear TF2.

The first synchronizer SL1 is disposed between the first drive gear D1 and the third drive gear D3 to selectively connect the first drive gear D1 and the third drive gear D3 to the first input shaft IS1.

Also, the second synchronizer SL2 is disposed between the second drive gear D2 and the fourth drive gear D4 to selectively connect the second drive gear D2 and the fourth drive gear D4 to the third input shaft IS3.

The gear ratio of the drive gears and the driven gears included in three shifting gear sets G1, G3, and G4 of the fixed speed stage module FT may be changed depending on the design condition of the corresponding power transmission apparatus. In the FIG. 3, the first drive gear D1 and the first driven gear P1 of the first shifting gear set G1 may be set as the gear ratio for the first forward speed stage, the second drive gear D2 and the first driven gear P1 may be set as the gear ratio for the second forward speed stage, the third drive gear D3 and the third driven gear P3 of the third shifting gear set G3 may be set as the gear ratio for the third forward speed stage, and the fourth drive gear D4 and the third driven gear P3 may be set as the gear ratio for the fourth forward speed stage. Also, the gear ratio of the fourth shifting gear set G4 is not limited thereto, however the third input shaft IS3 and the second input shaft IS2 may be set to be rotated with the same rotation speed and the same rotation direction thereof.

The first and second synchronizers SL1 and SL2 have the known configurations such that the detailed description thereof is omitted. The first and second sleeves SLE1 and SLE2 applied to the first, second synchronizer SL1 and SL2 are operated by a separate actuator as known to a person of an ordinary skill in the art, and the actuator is controlled by a transmission control device.

The first and second clutches CL1 and CL2 as an engagement element may be a hydraulic pressure friction engagement device operated by a hydraulic pressure supplied from a hydraulic pressure control apparatus. As the engagement elements, it is not limited thereto, and a multi-plate type hydraulic pressure friction engagement device of a wet type may be mainly used. However, it may include the engagement device which is operated depending on an electrical signal supplied from an electric control apparatus such as a dog clutch, a differential apparatus clutch, an electronic clutch, etc.

FIG. 5 is a shifting operational chart of a power transmission apparatus according to FIG. 3. The power transmission apparatus according to FIG. 3 may realize the reverse speed stage and forward speed stage in an EV mode and may realize four reverse speed stages and four forward speed stages in a HEV mode.

[The Reverse Speed Stage of the EV Mode]

In the reverse speed stage EV-REV of the EV mode, as shown in FIG. 5, the first and second synchronizers SL1 and SL2 are not operated and the second motor/generator MG2 is rotated with a reverse rotation speed.

Thus, the reverse rotation speed of the second motor/generator MG2 is transmitted to the final reduction gear FSDG of the differential apparatus DIFF through the output shaft OS and the output gear OG. Accordingly, the vehicle may be driven in the reverse speed stage of the EV mode.

[The Forward Speed Stage of the EV Mode]

In the forward speed stage EV-FD1 of the EV, as shown in FIG. 5, the first and second synchronizers SL1 and SL2 are not operated and the second motor/generator MG2 is rotated with a forward rotation speed.

Thus, the forward rotation speed of the second motor/generator MG2 is transmitted to the final reduction gear FSDG of the differential apparatus DIFF through the output shaft OS and the output gear OG. Accordingly, the vehicle is driven in the forward speed of the EV mode.

[The First Reverse Speed Stage of the HEV Mode]

In the first reverse speed stage REV1 of the HEV mode, as shown in FIG. 5, the first drive gear D1 and the first input shaft IS1 are operably connected through the sleeve SLE1 of the first synchronizer SL1 and the first clutch CL1 is operated.

Accordingly, the rotation speed of the engine ENG is input to the planet carrier PC and the reverse rotation speed of the first motor/generator M1 is input to the sun gear S. The rotation speed of the engine ENG and the reverse rotation speed of the first motor/generator M1 are combined with the reverse rotation speed in the planetary gear set PG and the combined reverse rotation speed is output through the ring gear R. The reverse rotation speed of the ring gear R is transmitted to the output gear OG through the first clutch CL1, the first input shaft IS1, the first drive gear D1, the first driven gear P1, and the output shaft OS by the operation of the first clutch CL1, and the reverse rotation speed output to the output gear OG is output as the reverse speed stage of the HEV mode through the final reduction gear FSDG of the differential apparatus DIFF.

[The Second Reverse Speed Stage of the HEV Mode]

In the second reverse speed stage REV2 of the HEV mode, as shown in FIG. 5, the second drive gear D2 and the third input shaft IS3 are operably connected through the sleeve SLE2 of the second synchronizer SL2 and the second clutch CL2 is operated.

Accordingly, the rotation speed of the engine ENG is input to the planet carrier PC, and the reverse rotation speed of the first motor/generator M1 is input to the sun gear S. The rotation speed of the engine ENG and the reverse rotation speed of the first motor/generator M1 are combined with the reverse rotation speed in the planetary gear set PG, and the combined reverse rotation speed is output through the ring gear R. The reverse rotation speed of the ring gear R is transmitted to the output gear OG through the second clutch CL2, the second input shaft IS2, the first power delivery gear TF1, the idle gear IDG, the second power delivery gear TF2, the third input shaft IS3, the second drive gear D2, the first driven gear P1, and the output shaft OS by the operation of the second clutch CL2, and the reverse rotation speed output to the output gear OG is output as the second reverse speed stage of the HEV mode through the final reduction gear FSDG of the differential apparatus DIFF.

[The Third Reverse Speed Stage of the HEV Mode]

In the third reverse speed stage REV3 of the HEV mode, as shown in FIG. 5, the third drive gear D3 and the first input shaft IS1 are operably connected through the sleeve SLE1 of the first synchronizer SL1 and the first clutch CL1 is operated.

Accordingly, the rotation speed of the engine ENG is input to the planet carrier PC, and the reverse rotation speed of the first motor/generator M1 is input to the sun gear S. The rotation speed of the engine ENG and the reverse rotation speed of the first motor/generator M1 are combined with the reverse rotation speed in the planetary gear set PG and the combined reverse rotation speed is output through the ring gear R. The reverse rotation speed of the ring gear R is transmitted to the output gear OG through the first clutch CL1, the first input shaft IS1, the third drive gear D3, the third driven gear P3, and the output shaft OS by the operation of the first clutch CL1, and the reverse rotation speed output to the output gear OG is output as the third reverse speed stage of the HEV mode through the final reduction gear FSDG of the differential apparatus DIFF.

[The Fourth Reverse Speed Stage of the HEV Mode]

In the fourth reverse speed stage REV4 of the HEV mode, as shown in FIG. 5, the fourth drive gear D4 and the third input shaft IS3 are operably connected through the sleeve SLE2 of the second synchronizer SL2 and the second clutch CL2 is operated.

Accordingly, the rotation speed of the engine ENG is input to the planet carrier PC and the reverse rotation speed of the first motor/generator M1 is input to the sun gear S. The rotation speed of the engine ENG and the reverse rotation speed of the first motor/generator M1 are combined with the reverse rotation speed in the planetary gear set PG and the combined reverse rotation speed is output through the ring gear R. The reverse rotation speed of the ring gear R is transmitted to the output gear OG through the second clutch CL2, the second input shaft IS2, the first power delivery gear TF1, the idle gear IDG, the second power delivery gear TF2, the third input shaft IS3, the fourth drive gear D4, the third driven gear P3, and the output shaft OS by the operation of the second clutch CL2, and the reverse rotation speed output to the output gear OG is output as the fourth reverse speed stage of the HEV mode through the final reduction gear FSDG of the differential apparatus DIFF.

[The First Forward Speed of the HEV Mode]

In the first forward speed stage FD1 of the HEV mode, as shown in FIG. 5, the first drive gear D1 and the first input shaft IS1 are operably connected through the sleeve SLE1 of the first synchronizer SL1 and the first clutch CL1 is operated.

Accordingly, the rotation speed of the engine ENG is input to the planet carrier PC and the rotation speed of the first motor/generator M1 is input to the sun gear S. The rotation speed of the engine ENG and the rotation speed of the first motor/generator M1 are combined in the planetary gear set PG and the combined rotation speed is output through the ring gear R. The rotation speed of the ring gear R is transmitted to the output gear OG through the first clutch CL1, the first input shaft IS1, the first drive gear D1, the first driven gear P1, and the output shaft OS by the operation of the first clutch CL1, and the rotation speed output to the output gear OG is output as the first forward speed stage of the HEV mode through the final reduction gear FSDG of the differential apparatus DIFF.

[The Second Forward Speed of the HEV Mode]

In the second forward speed stage FD2 of the HEV mode, as shown in FIG. 5, the second drive gear D2 and the third input shaft IS3 are operably connected through the sleeve SLE2 of the second synchronizer SL2 and the second clutch CL2 is operated.

Accordingly, the rotation speed of the engine ENG is input to the planet carrier PC and the rotation speed of the first motor/generator M1 is input to the sun gear S. The rotation speed of the engine ENG and the rotation speed of the first motor/generator M1 are combined in the planetary gear set PG and the combined rotation speed is output through the ring gear R. The rotation speed of the ring gear R is transmitted to the output gear OG through the second clutch CL2, the second input shaft IS2, the first power delivery gear TF1, the idle gear IDG, the second power delivery gear TF2, the third input shaft IS3, the second drive gear D2, the first driven gear P1, and the output shaft OS by the operation of the second clutch CL2, and the rotation speed output to the output gear OG is output as the second forward speed stage of the HEV mode through the final reduction gear FSDG of the differential apparatus DIFF.

[The Third Forward Speed of the HEV Mode]

In the third forward speed stage FD3 of the HEV mode, as shown in FIG. 5, the third drive gear D3 and the first input shaft IS1 are operably connected through the sleeve SLE1 of the first synchronizer SL1 and the first clutch CL1 is operated.

Accordingly, the rotation speed of the engine ENG is input to the planet carrier PC, and the rotation speed of the first motor/generator M1 is input to the sun gear S. The rotation speed of the engine ENG and the rotation speed of the first motor/generator M1 are combined in the planetary gear set PG and the combined rotation speed is output through the ring gear R. The rotation speed of the ring gear R is transmitted to the output gear OG through the first clutch CL1, the first input shaft IS1, the third drive gear D3, the third driven gear P3, and the output shaft OS by the operation of the first clutch CL1, and the rotation speed output to the output gear OG is output as the third forward speed stage of the HEV mode through the final reduction gear FSDG of the differential apparatus DIFF.

[The Fourth Forward Speed of the HEV Mode]

In the fourth forward speed stage FD4 of the HEV mode, as shown in FIG. 5, the fourth drive gear D4 and the third input shaft IS3 are operably connected through the sleeve SLE2 of the second synchronizer SL2 and the second clutch CL2 is operated.

Accordingly, the rotation speed of the engine ENG is input to the planet carrier PC and the rotation speed of the first motor/generator M1 is input to the sun gear S. The rotation speed of the engine ENG and the rotation speed of the first motor/generator M1 are combined in the planetary gear set PG, and the combined rotation speed is output through the ring gear R. The rotation speed of the ring gear R is transmitted to the output gear OG through the second clutch CL2, the second input shaft IS2, the first power delivery gear TF1, the idle gear IDG, the second power delivery gear TF2, the third input shaft IS3, the fourth drive gear D4, the third driven gear P3, and the output shaft OS by the operation of the second clutch CL2, and the rotation speed output to the output gear OG is output as the fourth forward speed stage through the final reduction gear FSDG of the differential apparatus DIFF HEV mode.

Also, the second motor/generator MG2 may assist the torque in four reverse speed stages and four forward speed stages of the HEV mode.

Figure 6:
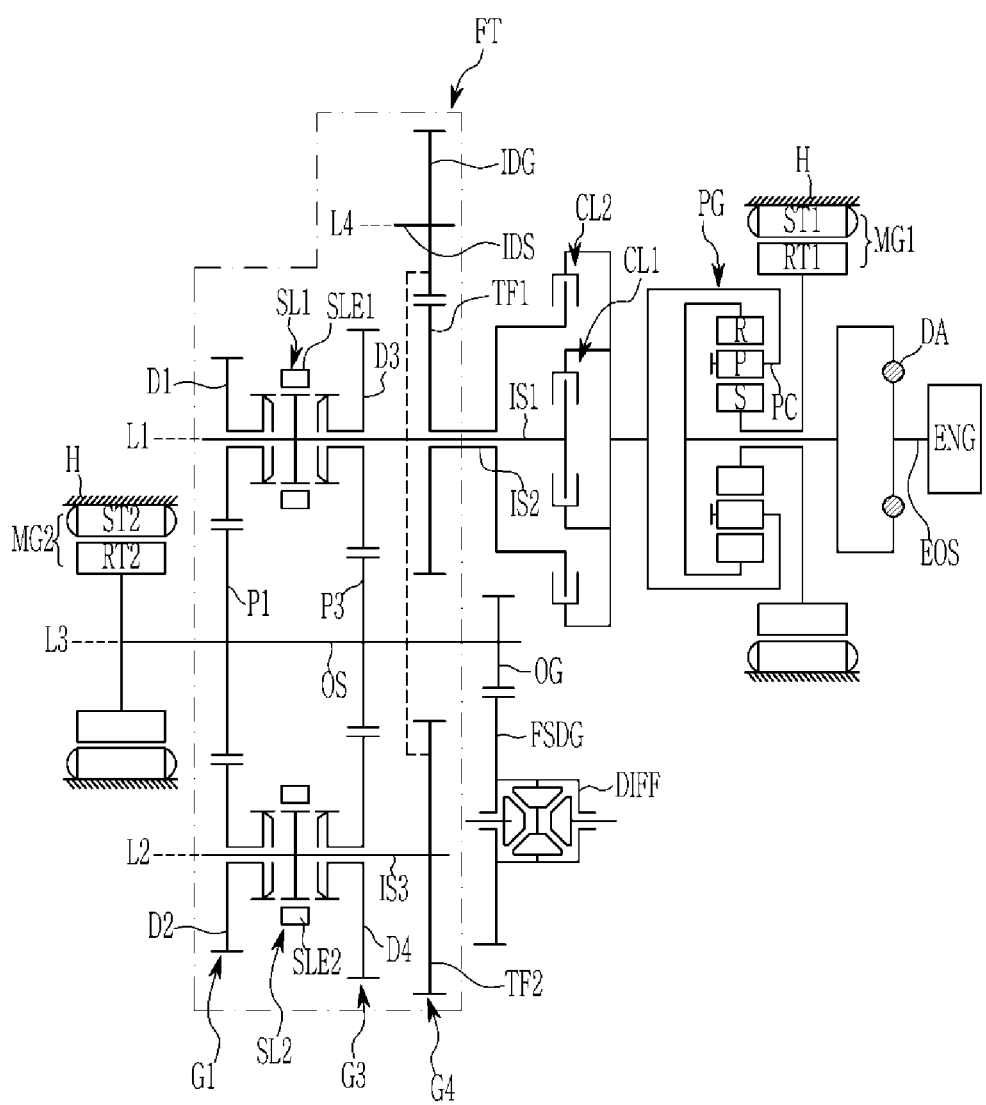
FIG. 6 is a schematic view of a power transmission apparatus for a vehicle according to various exemplary embodiments of the present invention.

FIG. 6 is a schematic diagram of a power transmission apparatus according to various exemplary embodiments of the present invention.

Referring to FIG. 6, the power transmission apparatus according to the various exemplary embodiments of the present invention is the same as the power transmission apparatus of FIG. 4 except for the connection configuration of the rotation elements S, PC, and R of the planetary gear set PG, the engine ENG, and the first motor/generator MG1.

In detail, in FIG. 4, the sun gear S is fixedly connected to the first motor/generator MG1, the planet carrier PC is fixedly connected to the engine ENG, and the ring gear R is always operated as the output element, however in the FIG. 6 of the present invention, the sun gear S is fixedly connected to the first motor/generator MG1 to be operated as the input element, the planet carrier PC is always operated as the output element, and the ring gear R is fixedly connected to the engine ENG to be operated as the input element.

The shifting process and the power delivery path of FIG. 6 is the same as that of FIG. 4 such that the detailed description thereof is omitted.

As the power transmission apparatus according to the several exemplary embodiments of the present invention adds one motor/generator and one planetary gear set to the conventional DCT structure using three synchronizers, the fixed speed stage of multi stages including four forward speed stages and one reverse speed stage may be realized while minimizing a number of internal configuration parts in the HEV mode, a weight may be minimized, a mountability and a fuel consumption may be improved.

As the power transmission apparatus according to the several exemplary embodiments of the present invention adds two motor/generators to the conventional DCT structure using two synchronizers, the EV mode implementing the forward/reverse driving and the HEV mode implementing four forward speed stages and four reverse speed stages may be provided, improving the fuel consumption.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A power transmission apparatus for a vehicle comprising;
an engine;
a first motor/generator;
a planetary gear set including a first rotation element fixedly connected to the engine, a second rotation element fixedly connected to the first motor/generator, and a third rotation element outputting a rotation speed in which a rotation speed of the engine and a rotation speed of the first motor/generator are combined;
a first input shaft selectively connectable to the third rotation element through a first clutch;
a second input shaft enclosing at least one portion of the first input shaft and selectively connectable to the third rotation element through a second clutch;
a third input shaft disposed parallel to and apart from the first input shaft;
an output shaft disposed parallel to and apart from the first input shaft;
an idle shaft disposed parallel to and apart from the second input shaft and operably connected to the second input shaft and the third input shaft through gears to transmit a rotation power of the second input shaft to the third input shaft; and
a fixed speed stage module including:
a plurality of shifting gear sets which includes:
at least two among drive gears, wherein each of the drive gears are rotatably disposed on the first input shaft, the third input shaft, and the idle shaft, respectively;
driven gears each being engaged with the corresponding drive gears, respectively; wherein each of the driven gears is fixedly disposed on the output shaft; and
power delivery gears and an idle gear, wherein each of the power delivery gears is fixedly disposed on the second input shaft and the third input shaft, respectively, and wherein the idle near is fixedly disposed on the idle shaft, the power delivery gears and the idle gear being engaged with another; and
a plurality of synchronizers selectively connecting at least one among the drive gears to the first input shaft, the third input shaft, or the idle shaft.

2. The power transmission apparatus for the vehicle of claim 1, wherein the planetary gear set is a single pinion planetary gear set, the first rotation element is a planet carrier, the second rotation element is a sun gear, and the third rotation element is a ring gear.

3. The power transmission apparatus for the vehicle of claim 2,
wherein the drive gears include a first drive gear, a second drive gear, a third drive gear, a fourth drive gear, and a reverse drive gear,
wherein the driven gears include a first driven gear, a second driven gear, and a third driven gear,
wherein the power delivery gears include a first power delivery gear and a second power delivery gear near, and
wherein the plurality of shifting gear sets include:
a first shifting gear set including the first drive gear rotatably disposed on the first input shaft, the second drive gear rotatably disposed on the third input shaft, and the first driven gear fixedly disposed on the output shaft and engaged with the first drive gear and the second drive gear;
a second shifting gear set including the reverse drive gear rotatably disposed on the idle shaft and the second driven gear fixedly connected to the output shaft and engaged with the reverse drive gear;
a third shifting gear set including the third drive gear rotatably disposed on the first input shaft, the fourth drive gear rotatably disposed on the third input shaft, and the third driven gear fixedly disposed on the output shaft and engaged with the third drive gear and the fourth drive gear; and
a fourth shifting gear set including the first power delivery gear fixedly disposed on the second input shaft, the second power delivery gear fixedly disposed on the third input shaft, and the idle gear fixedly disposed on the idle shaft and engaged with the first power delivery gear and the second power delivery gear.

4. The power transmission apparatus for the vehicle of claim 3, wherein the plurality of synchronizers includes:
a first synchronizer selectively connecting the first drive gear or the third drive gear to the first input shaft;
a second synchronizer selectively connecting the second drive gear or the fourth drive gear to the third input shaft; and
a third synchronizer selectively connecting the reverse drive gear to the idle shaft.

5. The power transmission apparatus for the vehicle of claim 3, wherein the power transmission apparatus further includes:
an output gear fixedly disposed on the output shaft; and
a differential apparatus including a final reduction gear engaged with the output gear.

6. The power transmission apparatus for the vehicle of claim 2,
wherein the drive gears include a first drive gear, a second drive gear, a third drive gear, a fourth drive gear, and a reverse drive gear,
wherein the driven gears include a first driven gear, a second driven gear, and a third driven gear,
wherein the power delivery gears include a first power delivery gear and a second power delivery gear, and
wherein the plurality of shifting gear sets includes;
a first shifting gear set including the first drive gear rotatably disposed on the first input shaft, the second drive gear rotatably disposed on the third input shaft, and the first driven gear fixedly disposed on the output shaft and engaged with the first drive gear and the second drive gear;
a third shifting gear set including the third drive gear rotatably disposed on the first input shaft, the fourth drive gear rotatably disposed on the third input shaft, and the third driven gear fixedly disposed on the output shaft and engaged with the third drive gear and the fourth drive gear; and
a fourth shifting gear set including the first power delivery gear fixedly disposed on the second input shaft, the second power delivery gear fixedly disposed on the third input shaft, and the idle gear fixedly disposed on the idle shaft and engaged with the first power delivery gear and the second power delivery gear.

7. The power transmission apparatus for the vehicle of claim 6, wherein the plurality of synchronizers includes:
a first synchronizer selectively connecting the first drive gear or the third drive gear to the first input shaft; and
a second synchronizer selectively connecting the second drive gear or the fourth drive gear to the third input shaft.

8. The power transmission apparatus for the vehicle of claim 6, wherein the power transmission apparatus further includes a second motor/generator fixedly connected to the output shaft.

9. The power transmission apparatus for the vehicle of claim 6, wherein the power transmission apparatus further includes:
an output gear fixedly disposed on the output shaft; and
a differential apparatus including a final reduction gear engaged with the output gear.

10. The power transmission apparatus for the vehicle of claim 1, wherein the planetary gear set is a single pinion planetary gear set, the first rotation element is a ring gear, the second rotation element is a sun gear, and the third rotation element is a planet carrier.

11. The power transmission apparatus for the vehicle of claim 10,
wherein the drive gears include a first drive gear, a second drive gear, a third drive gear, a fourth drive gear, and a reverse drive gear,
wherein the driven gears include a first driven gear, a second driven gear, and a third driven gear,
wherein the, power delivery gears include a first power delivery gear and a second power delivery gear, and
wherein the plurality of shifting gear sets includes:
a first shifting gear set including the first drive gear rotatably disposed on the first input shaft, the second drive gear rotatably disposed on the third input shaft, and the first driven gear fixedly disposed on the output shaft and engaged with the first drive gear and the second drive gear;
a second shifting gear set including the reverse drive gear rotatably disposed on the idle shaft and the second driven gear fixedly connected to the output shaft and engaged with the reverse drive gear;
a third shifting gear set including the third drive gear rotatably disposed on the first input shaft, the fourth drive gear rotatably disposed on the third input shaft, and the third driven gear fixedly disposed on the output shaft and engaged with the third drive gear and the fourth drive gear; and
a fourth shifting gear set including the first power delivery gear fixedly disposed on the second input shaft, the second power delivery gear fixedly disposed on the third input shaft, and the idle gear fixedly disposed on the idle shaft and engaged with the first power delivery gear and the second power delivery gear.

12. The power transmission apparatus for the vehicle of claim 11, wherein the plurality of synchronizers includes:
a first synchronizer selectively connecting the first drive gear or the third drive gear to the first input shaft;
a second synchronizer selectively connecting the second drive gear or the fourth drive gear to the third input shaft; and
a third synchronizer selectively connecting the reverse drive gear to the idle shaft.

13. The power transmission apparatus for the vehicle of claim 11, wherein the power transmission apparatus further includes:
an output gear fixedly disposed on the output shaft; and
a differential apparatus including a final reduction gear engaged with the output gear.

14. The power transmission apparatus for the vehicle of claim 10,
wherein the drive gears include a first drive gear, a second drive gear, a third drive gear, a fourth drive gear and a reverse drive pear,
wherein the driven gears include a first driven gear, a second driven gear, and a third driven gear,
wherein the power delivery gears include a first power delivery gear and a second power delivery gear, and
wherein the plurality of shifting gear sets includes:
a first shifting gear set including the first drive gear rotatably disposed on the first input shaft, the second drive gear rotatably disposed on the third input shaft, and the first driven gear fixedly disposed on the output shaft and engaged with the first drive gear and the second drive gear;
a third shifting gear set including the third drive gear rotatably disposed on the first input shaft, the fourth drive gear rotatably disposed on the third input shaft, and the third driven gear fixedly disposed on the output shaft and engaged with the third drive gear and the fourth drive gear; and
a fourth shifting gear set including the first power delivery gear fixedly disposed on the second input shaft, the second power delivery gear fixedly disposed on the third input shaft, and the idle gear fixedly disposed on the idle shaft and engaged with the first power delivery gear and the second power delivery gear.

15. The power transmission apparatus for the vehicle of claim 14, wherein
the plurality of synchronizers includes:
a first synchronizer selectively connecting the first drive gear or the third drive gear to the first input shaft; and
a second synchronizer selectively connecting the second drive gear or the fourth drive gear to the third input shaft.

16. The power transmission apparatus for the vehicle of claim 14, wherein the power transmission apparatus further includes a second motor/generator fixedly connected to the output shaft.

17. The power transmission apparatus for the vehicle of claim 14, wherein the power transmission apparatus further includes:
an output gear fixedly disposed on the output shaft; and
a differential apparatus including a final reduction gear engaged with the output gear.

* * * * *